United States Patent [19]
Kalen

[11] 3,854,902
[45] Dec. 17, 1974

[54] METHOD OF FILTERING GAS

[75] Inventor: Bodo Kalen, Long Island, N.Y.

[73] Assignee: The Ducon Company, Inc., Mineola, N.Y.

[22] Filed: Aug. 22, 1973

[21] Appl. No.: 390,669

Related U.S. Application Data

[62] Division of Ser. No. 184,395, Sept. 28, 1971.

[52] U.S. Cl.......................................... 55/96, 55/98
[51] Int. Cl............................................ B01d 46/30
[58] Field of Search......... 55/96, 98, 302, 316, 315, 55/318, 387, 484, 474, 479, 512, 513, 514, 515, 516, 517, 518, 519, 74, 77, 293, 324, 459, 423, 337

[56] References Cited
UNITED STATES PATENTS

| | | | |
|---|---|---|---|
| 2,804,168 | 8/1957 | Church | 55/302 |
| 2,951,551 | 9/1960 | West | 55/316 |
| 3,166,382 | 1/1965 | Purse et al. | 23/288 F |
| 3,410,055 | 11/1968 | Zenz | 55/96 |
| 3,410,056 | 11/1968 | Reinauer | 55/96 |

FOREIGN PATENTS OR APPLICATIONS

| | | | |
|---|---|---|---|
| 984,844 | 3/1965 | Great Britain | 55/516 |
| 45-5,118 | 2/1970 | Japan | 55/96 |

Primary Examiner—Dennis E. Talbert, Jr.
Attorney, Agent, or Firm—Seidel, Gonda & Goldhammer

[57] ABSTRACT

High temperature dirty gas is filtered in an axial direction through granular material in superimposed narrow filter chambers, and the granular material may be backwashed by pulses of high pressure air.

8 Claims, 6 Drawing Figures

PATENTED DEC 17 1974

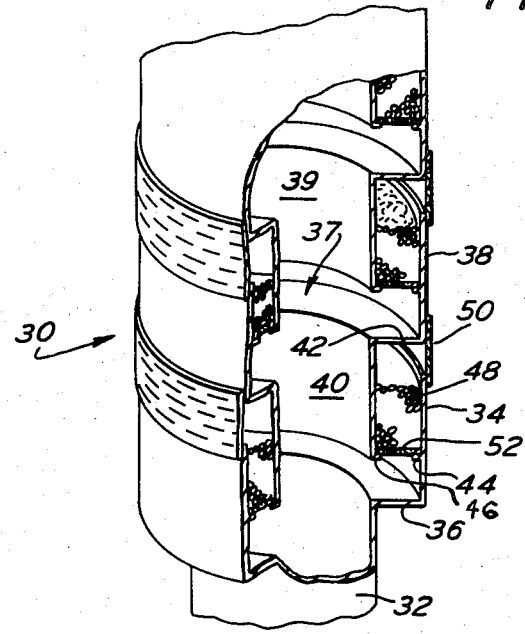
FIG. 2
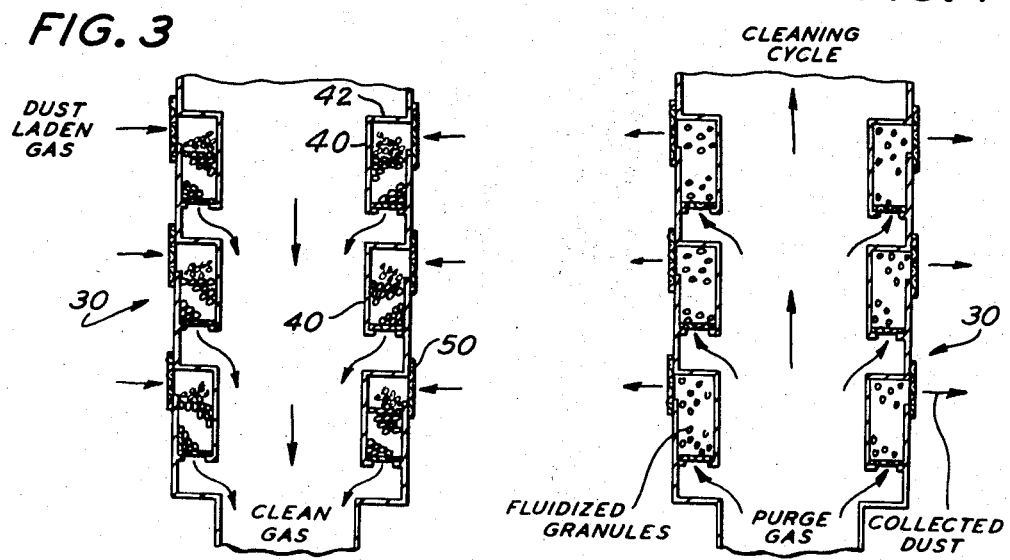
FIG. 3
FIG. 4

METHOD OF FILTERING GAS

This is a division of copending application Ser. No. 184,395 filed Sept. 28, 1971 now patent number 3,798,882, and entitled Granular Bed Filter Apparatus and Method.

The present invention is directed to a granular bed filter which represents a new approach to air pullution control. While the present invention is adapted for use in a wide variety of environments, it is particularly adapted for use in connection with high temperature flue gases which may have been precleaned by cyclones but still contain fine particles. The fine particles that remain in the flue gases must be removed if the thermal energy of the flue gases are to be reused for power recovery. If those fine particles are not removed, they tend to wear away the turbine blades or interfere with the proper operation of the blades or other power recovery equipment.

The granular bed filter of the present invention includes one or more filter stacks. Each filter stack includes a series of discrete annular members. Each annular member includes an inner wall and an outer wall interconnected by an intermediate wall. Intermediate wall may be radial or inclined with respect to the longitudinal axis of the stack.

The inner wall of one annular member cooperates with the outer wall on an adjacent annular member to define a space in which granular filter material may be supported. A screen extends across adjacent outer walls of adjacent annular members to define an inlet to the filter bed. A generally horizontal screen defines the bottom of the bed and the outlet from the bed to the interior of the filter stack.

The present invention is an improvement over the expandable bed filter in U.S. Pat. No. 3,410,055. While the filter in said patent performs satisfactorily under certain environmental conditions, I have found that more satisfactory and more efficient results are obtained under certain environmental conditions by the apparatus and method of the present invention. The filter beds of the present invention are of narrow width. I have found that narrow width annular filter bed produce more efficient results since the approximate angle of repose of the granular material after each backwashing in such narrow beds has little or no effect on the equal gas distribution needed for fluidizing the filter bed during backwashing. Thus, this results in a substantially constant bed height.

Each filter stack is provided with its own backwash nozzle aligned therewith. Backwashing is preferably accomplished using a post jet high pressure technique wherein air at a high pressure is introduced into the filter stack to induce the plenum air to fluidize the filter bed. The air pressure for backwashing should be in excess of 80 psi and preferably between 150 and 200 psi for a bed having approximately 4 pounds of No. ½ sand in each filter compartment. Backwashing is preferably accomplished by two jets or pulses of air timed so as to occur approximately 0.10 to 0.15 seconds delay. In this manner, the second pulse will induce a shock wave in the filter bed before the filter bed has collapsed from its fluidized state. In addition, the backwash pulses of air are at a velocity which is at least twice the velocity needed to induce incipient fluidization so as to remove and carry away the agglomerated particles which have been collected by the filter bed.

In accordance with the method of the present invention, dirty gas is introduced radially into a hollow stack by way of an inlet screen to annular filter beds of granular material. The problems associated with the angle of repose of the granular material are minimized by having filter beds of narrow width. The dirty gas is filtered by passing through the annular filter beds in an axial direction. The cleaned gas enters the stack and discharged in an axial direction therefrom.

The screens are preferably of the slotted plate type rather than of the wire mesh type. The size of the slots will vary with the type of granular material being utilized. However, the slots will always be longer than their width. I have found that a slotted plate type screen having slots longer than their width is easier to clean by backwashing as compared with wire mesh screens. This is particularly true wherein the particles carried by the dirty gas are of a sticky nature.

It is a specific object of the present invention to provide a and method which is adapted for use with high temperature and dirty gases containing fine particles which must be removed therefrom.

It is another object of the present invention to provide a method of gas filtration capable of handling gases containing sticky materials while having a high gas capacity and high efficiency while utilizing narrow granular filter beds capable of being more efficiently backwashed.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a partial perspective view of a stack of filter elements broken away for purposes of illustration.

FIG. 3 is a diagrammatic illustration of the collection cycle.

FIG. 4 is a diagrammatic illustration of the backwash-cleaning cycle.

Figure 1:
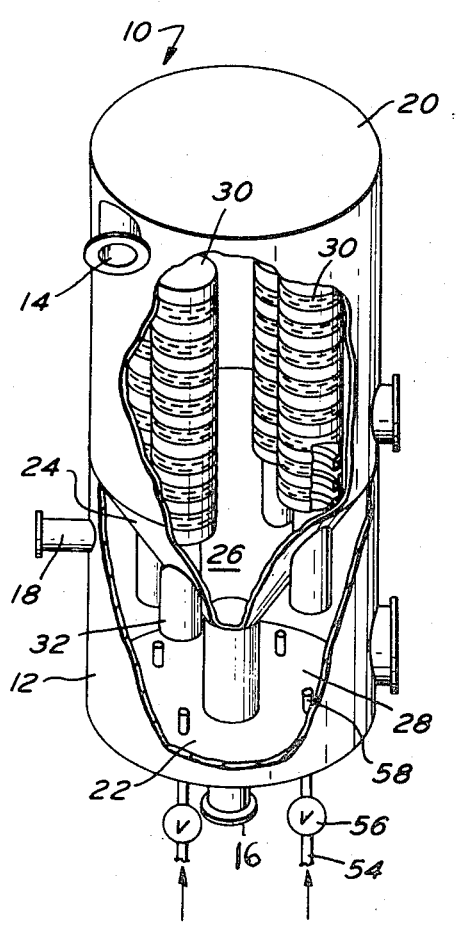
FIG. 1 is a diagrammatic illustration of filter apparatus in accordance with the present invention with portions broken away for purposes of illustration.

Referring to the drawing in detail, wherein like numerals indicate like elements, there is shown in FIG. 1 a granular bed filter apparatus in accordance with the present invention designated generally as 10. The filter apparatus 10 includes a housing designated generally as 12. While the housing 12 is indicated in the drawing as having a cylindrical configuration, other configurations may be utilized for the housing. Thus, the housing may be a combination of a cylinder and a cone or any other configuration.

The housing 12 includes a tangentially arranged dirty gas inlet 14 adjacent the top wall 20 thereof. The inlet 14 need not be tangentially arranged and may be located in any convenient position on the housing 12. Housing 12 is provided with a dust outlet 16 axially arranged within the housing 12 and extending through the bottom wall 22 thereof. Housing 12 is also provided with a clean gas outlet 18.

The interior of the housing 12 may be divided into an inlet chamber 26 and an outlet or plenum chamber 28 by means of the wall 24. Wall 24 need not be of funnel shape as shown but may be at horizontal or at other angular relationships. It will be noted that the dust outlet 16 communicates directly with the inlet chamber 26.

Within the inlet chamber 26, there is supported one or more stacks of filter elements 30. The stacks 30 may be supported from above or below. For purposes of illustrated, the stacks 30 are supported by the wall 24 and extend upwardly therefrom. When a plurality of stacks is supported within the chamber 26, they are preferably circumferentially arranged and spaced from one another a suitable distance. Each stack 30 is supported from the wall 24 by means of an outlet conduit 32 which communicates the interior of the stack with the outlet chamber 28. Since each of the stacks 30 is identical, only one stack will be described in detail.

As shown more clearly in FIG. 2, the conduit 32 is connected to a cylindrical outer wall 34 by means of an intermediate horizontally disposed wall 36. Above walls 34 and 36, there are provided a plurality of superimposed annular members 37, 39, etc. Each annular member includes a cylindrical outer wall 38 connected to a cylindrical inner wall 40 by means of an intermediate wall 42. In FIG. 2, the intermediate wall 42 is radially arranged with respect to the longitudinal axis of the stack.

A radially outwardly extending flange 46 is provided at the lower end of the inner wall 40. A radially inwardly extending flange 44 is provided on each of the outer walls 34, 38, etc. The space between the inner wall 40 on one annular member and the outer wall on the next adjacent annular member defines a narrow annular chamber filled with granular material to define a filter bed. The filter bed between walls 34 and 40 is defined as 48.

A cylindrical screen 50 extends between the outer walls on adjacent annular members. Screen 50 provides an inlet to the filter bed and may be separate from or integral with wall 34. An inner screen 52 is supported by the radially extending flanges on adjacent annular members such as flanges 46 and 44. Screen 52 defines an outlet from the filter bed so that cleaned air may enter the interior of the stack and discharge axially through the conduit 32.

The screens 50 and 52 are preferably of the slotted plate type rather than being of the wire mesh type. I have found that screens of the slotted plate type are more easily cleaned during backwashing and have a longer life than small wire mesh screens which tend to oxidize more quickly in high temperature environments. Also, slot size can be independent of the plate thickness whereas this is not true of wire mesh screens. The size of the slots will vary with the size of the granular material. In a typical filter bed wherein the granular filter material is an inert sand such as No. ½ sand, the slots in the screens 50 and 52 may be 0.0138 × 0.140 inch in plates having a thickness of 0.0244 inch. The thickness of the plates and the size of the slots will vary under the different temperature conditions in which the filter will be used and the size of granular material being used. The transverse dimensions of the slots should always be less than the transverse dimensions of the filter material.

A backwash nozzle 58 is supported in any convenient manner aligned with each of the filter stacks. Nozzle 58 is conveniently supported by the bottom wall 22 in the illustrated embodiment and communicates with a conduit 54 having a control valve 56. Conduit 54 is preferably in communication with a source of high pressure air such as air at a pressure of 150 to 200 psi. Valve 56 is a commercially available pilot operated diaphragm valve provided with a timer so that sequential pulses of backwash air may be introduced into the outlet chamber 28.

In an operative embodiment of the present invention, satisfactory results were obtained using backwash pulses spaced from one another by 0.10 to 0.15 seconds. The high pressure air released during backwash at 180 psi had a volume of approximately 3.7 standard cubic feet for the two pulses from nozzle 58 which was connected to valve 56 having a ¾ inch opening. The high pressure backwash air induces the air flow from the plenum chamber to fluidize the filter beds. Satisfactory results have been utilized under these conditions wherein the volume of the plenum air was approximately 18 cubic feet. The pulses were timed so that the second pulse creates a shock wave received at the filter beds before the filter beds have collapsed from their fluidized state as a result of the first pulse.

As will be apparent from the drawing, the filter beds are comprised of granular material which occupies less than the total amount of the space in the filter chambers. Thus, approximately 25 percent of the space in the filter chambers above the filter beds is unoccupied so that the bed may be fluidized into that space.

Figure 5:
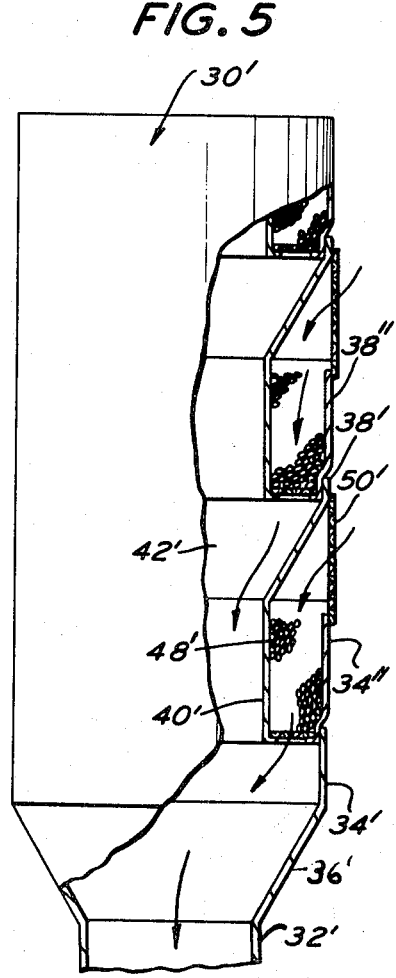
FIG. 5 is a view similar to FIG. 2, but illustrating another embodiment of the present invention particularly adapted for use with sticky materials.

In FIG. 5, there is illustrated a stack in accordance with another embodiment of the present invention designated generally as 30'. Stack 30' is identical with stack 30 except as will be made clear hereinafter. Stack 30' is particularly adapted for use with dirty air containing sticky particles such as hydrated lime, titanium dioxide, iron oxide, etc. In stack 30', corresponding elements are provided with corresponding primed numerals.

In stack 30', the intermediate wall 42' is sloped at an angle of approximate 30° with respect to the longitudinal axis of the stack. Also, the height of the filter bed 48' is above the upper edge of the outer wall of the annular members so that the upper portion of the filter bed 48' overlaps the lower portion of the screen 50'. Each of these features of the stack 30' provides for more efficient cleaning of the filter bed with sticky or gummy materials which tend to form a coating on the filter bed. Thus, even if the sticky material forms a coating across the top of the filter bed 48', the backwash air could still escape through the screen 50'. Stack 30' is otherwise the same as stack 30 and utilized in the same manner.

Figure 6:
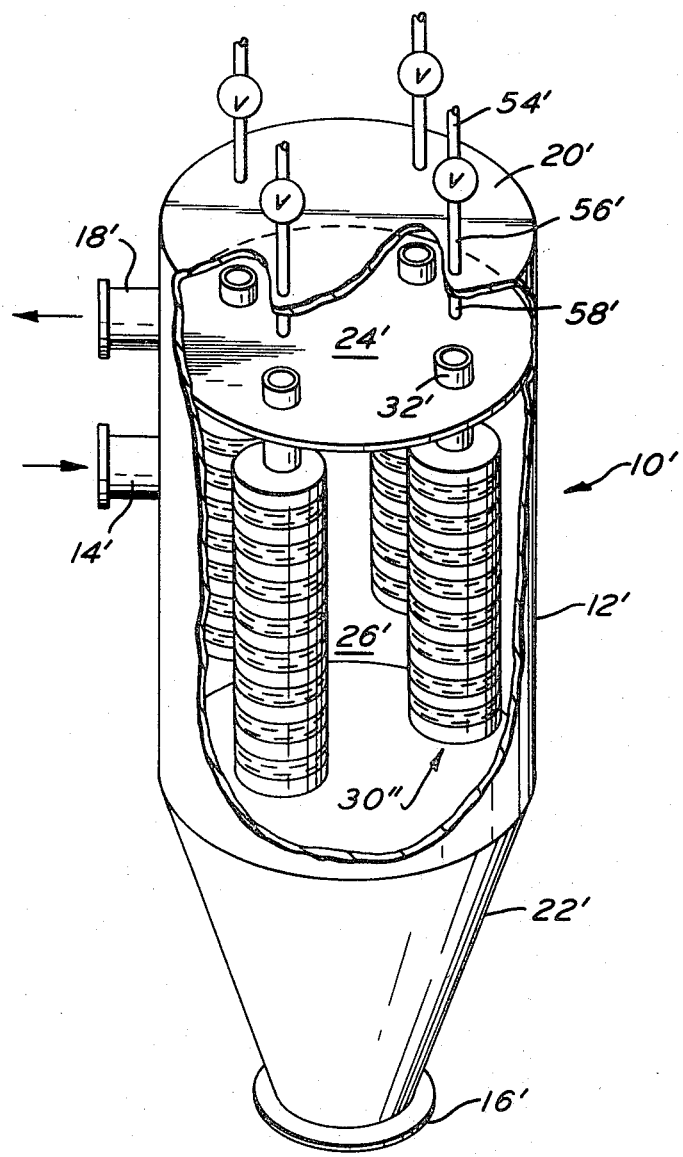
FIG. 6 is a view similar to FIG. 1 but showing another embodiment wherein the stacks are supported from above.

In FIG. 6 there is shown another embodiment designated 10'. Apparatus 10' is identical with apparatus 10 except as set forth hereinafter. In apparatus 10' corresponding elements are identified by corresponding primed numerals. In apparatus 10', the stacks 30'' are below wall 24' and supported therefrom in depending relation. Inlet 14' is radially disposed on housing 12' and is located below outlet 18'. The nozzles 58' are supported by wall 20', each opposite one of the conduits 32'.

If desired, flanges 44 and 46 may be eliminated. This could be accomplished by making walls 34 and 40 integral with a horizontal wall having slots to define a screen which performs the function of screen 52.

The operation of the apparatus 10 is as follows:

The apparatus 10 may be utilized with gas throughput in the range of 10 to 100 CFM/sqft. of filter area. The filter apparatus at said throughput range operates at pressure drops of 2" to 20" of water under standard gas conditions and when using No. ½ sand. Controlling porosity by varying the depth of the filter bed and the granular filter medium results in efficiencies as high as 99.9 percent. Particles in the submicron size can be effectively recovered. There are no moving parts, no electrical field, no rotating seals, and no fatigue-prone fibers or membranes, whereby long life may be attained.

Dirty gas enters inlet 14 tangentially at the top of the housing 12 and travels downwardly. The gas passes radially through the outer screens 50 or 50' and then axially through the filter beds. The cleaned gas exits from the air screens and collects in the interior of the stacks for axial discharge to the outlet chamber 28. From chamber 28, the clean gas exits through outlet 18. In this regard, see the collection cycle diagrammatically illustrated in FIG. 3.

When the accumulation of collected particulate causes the pressure drop to reach a specified level, the filter beds may be backwashed. In this regard, see the cleaning cycle diagrammatically illustrated in FIG. 4. Backwashing is preferably otained without in any way interfering with the continuous inflow of dirty gas and the exiting of clean gas through outlet 18.

Each of the stacks is provided with its own backwash nozzle aligned therewith. Each stack is independently backwashed when needed. Backwashing includes introducing high pressure high velocity air into the stack. If a velocity of 1 foot per second would be sufficient to fluidize the filter bed 48, the backwash air would have a velocity of at least 2 feet per second. The primary backwash air is preferably introduced at 150 to 200 psi in sequential pulses with a short duration between pulses to be certain that the second pulse introduces an air shock wave to the filter bed before the fluidized filter bed has collapsed. A suitable time delay would be in the range of 0.10 to 0.15 seconds on a narrow filter bed of the size referred to hereinafter.

When fluidizing the beds under the conditions set forth above, the granular material will be subjected to the following sequence:

a. the granular material is at rest during the collection cycle, b. expansion and fluidization of the bed during the first phase of the cleaning cycle and then lift-up of the entire bed until it hits and comes to rest in a non-fluidized state against wall 42 which defines the top wall of the bed with a void between the bed and screen 52, c. bed falls after first pulse, d. before the bed comes to rest again as per (a), the second pulse occurs which repeats step (b), and e. the bed come to rest as per (a) for further operation with cleaned granular material as per the collection cycle. When the bed comes to rest after step (e), the granular material upper surface will be at an acute angle less than the angle of respose. Thus, the height of the bed is more uniform and thereby desirable for repeating step (b) during the next cleaning cycle.

During steps (b), (c), and (d), the granular material is cleaned of particles in interstices and of agglomerated particles which may adhere to said granular material. This cleaning would not have been attained if the backwash velocity were merely that which would be necessary for fluidization of the bed and transport of collected particles. I believe the cleaning of particles adhered to the granular material is enhanced by an intergranular rubbing action. Unless particles adhered to the granular material are constantly removed, the height of the bed will increase to a point wherein the space above the bed has decreased so that there is insufficient space for expansion during fluidization of the bed. Thus, the apparatus becomes inoperative due to the high pressure drop.

Successful results have been obtained utilizing a narrow annular filter bed 48. With a stack having its outer diameter of 8 inches and the diameter of the inner walls such as wall 40 being 5 inches, the filter bed 48 had a width in a radial direction of 1½ inches. The primary backwash air was a total of 3.7 cubic feet per two pulses. The amount of the induced air in the outlet chamber 28 could be two or more times the volume of the primary air.

In the above-mentioned working embodiment wherein the radial width of the filter bed was 1½ inches, the height was 2¾ inches. The granular filter material was No. ½ sand having a voidage of 0.42 and a mean particle diameter of 0.019 inches.

For ease of manufacture, the outer wall of each annular member of stacks 30 or 30' may be comprised of two elements joined together. For example, see FIG. 5 wherein wall 34' is hermetically sealed to an offset portion of wall 34" and wall 38' is similarly joined to wall 38". The flange for supporting the outer periphery of the bottom screen would be at the bottom edge of walls 34"', 38"', etc. In FIG. 5, it will be noted that wall 36' is sloped like 42'.

The above dimensions and sizes are illustrative. A narrow annular filter bed will generally have dimensions which will result in the outside diameter of the stack being from about five to six times the radial width of the filter bed.

The present invention is useful for removing particles from high temperature gases in the utility, petroleum, steel and special chemical industries. Also, the present invention may be used in an environment wherein the granular material is an adsorber, such as charcoal, for removing particulates and gases such as sulfur dioxide from the dirty stream.

The present invention may be embodied in other specified forms without departing from the spirit or essential attributes thereof and, accordingly, reference should be made to the appended claims, rather than to the foregoing specification as indicating the scope of the invention.

I claim:

1. A method of filtering high temperature dirty gas comprising the steps of passing the dirty gas radially inwardly through discrete inlet screens coaxial with a center chamber to discrete superimposed annular filter chambers containing granular material occupying less than the total volume of the annular filter chambers so as to leave an unoccupied space at the top of each filter chamber, minimizing the effect of the angle of repose of the granular material by using horizontal filter beds whose radial width is between 1/5 and 1/6 of the outer diameter of the filter chambers, filtering out particulate from the dirty gas by passing the gas in an axial direction with respect to the filter chambers through the granular material, collecting the cleaned gas within the central chamber radially inwardly of the filter chambers, discharging the cleaned gas from the center chamber in an axial direction thereof, and backwashing said granular material in each filter chamber into the unoccupied space above each filter chamber by introducing pulses of high pressure air into said center chamber with the high pressure air discharging through said screens, and preventing loss of the granular material by using screens having transverse dimensions which are less than the transverse dimensions of the granular material.

2. A method in accordance with claim 1 wherein said backwashing step includes introducing at least two pulses of pressurized air, spacing the pulses so that the second pulse reaches the filter bed before the fluidized bed has completely collapsed from the first pulse, and said step of fluidizing said bed including using air having a velocity substantially greater than the velocity needed to fluidize the bed and transport collected particulates.

3. A method in accordance with claim 2 wherein the pulses are timed so as to be approximately 0.10 to 0.15 seconds apart.

4. A method in accordance with claim 1 wherein the volume of the high pressure backwash air is substantially less than the volume of air in the outlet chamber.

5. A method in accordance with claim 1 wherein the volume of the primary backwash air is substantially less than the volume of induced backwash air.

6. A method in accordance with claim 2 including lifting up the bed after each fluidization of the bed so as to have a void between the bottom of the bed and a support screen below the bed.

7. A method in accordance with claim 1 wherein said backwashing step includes detaching particulate adhered to the granular material.

8. A method in accordance with claim 1 including using inlet screens having openings in the form of elongated slots whose transverse dimensions are less than the transverse dimensions of the granular material.

* * * * *